United States Patent
Rafanello et al.

(10) Patent No.: US 6,711,591 B1
(45) Date of Patent: Mar. 23, 2004

(54) TOP-DOWN CONTROL OF MULTIPLE LAYER AGGREGATION LOGICAL VOLUME MANAGEMENT DATA AND BOOT RECORD

(75) Inventors: Benedict Michael Rafanello, Round Rock, TX (US); Mark A. Peloquin, Austin, TX (US); Cuong Huu Tran, Austin, TX (US); Cristi Nesbitt Ullmann, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 09/616,146

(22) Filed: Jul. 13, 2000

(51) Int. Cl.$^7$ .............................................. G06F 12/00
(52) U.S. Cl. ...................... 707/200; 707/201; 707/202; 707/203; 707/204; 707/205; 707/206; 711/111; 711/112; 711/114; 711/162; 713/1; 713/2
(58) Field of Search ................................. 711/161, 162, 711/170–173, 111–114; 713/1, 2; 707/200–206

(56) References Cited

U.S. PATENT DOCUMENTS

| | | | |
|---|---|---|---|
| 5,790,773 A | 8/1998 | DeKoning et al. | 395/182.04 |
| 5,796,988 A | 8/1998 | Naidu et al. | 395/500 |
| 5,897,661 A | 4/1999 | Baranovsky et al. | 711/170 |
| 6,192,471 B1 * | 2/2001 | Pearce et al. | 713/2 |
| 6,366,986 B1 * | 4/2002 | St. Pierre et al. | 711/162 |
| 6,401,183 B1 * | 6/2002 | Rafizadeh | 711/173 |

* cited by examiner

*Primary Examiner*—Jeffrey Gaffin
*Assistant Examiner*—Mike Nguyen
(74) *Attorney, Agent, or Firm*—Robert H. Frantz; David A. Mims, Jr.

(57) ABSTRACT

A system and method for control of data and boot records associated with multi-layer logical volumes allows the logical volume data area containing the fake EBR to be deterministically and efficiently accessed by using a "top down" control methodology. Control of the logical volume manager ("LVM") data area is distributed. An LVM data area is placed on each aggregate as well as on each partition, and the fake EBR is placed in the LVM data area of the topmost aggregate. The topmost aggregator controls access to the fake EBR, and only this aggregator must provide API functionality to access the fake EBR. This allows the fake EBR to be found and accessed only by new software applications which are "aware" of the fake EBR, while allowing legacy aggregators to continue to function correctly and allowing legacy software applications to continue to interwork with legacy aggregators through their unchanged APIs.

27 Claims, 6 Drawing Sheets

*Prior Art*

*Figure 3*

*Prior Art*

TOP-DOWN CONTROL OF MULTIPLE LAYER AGGREGATION LOGICAL VOLUME MANAGEMENT DATA AND BOOT RECORD

CROSS-REFERENCE TO RELATED APPLICATIONS (CLAIMING BENEFIT UNDER 35 U.S.C. 120)

This application is related to U.S. application Ser. No. 09/561,184 filed on Apr. 27, 2000, and to U.S. application Ser. No. 09/616,131 filed on Jul. 13, 2000, both by Benedict Michael Rafanello, et al. Both related application are commonly assigned.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related application, Ser. Nos. 09/561,184 and 09/616,131, filed on Apr. 27, 2000, and Jul. 13, 2000, respectively, by Benedict Michael Rafanello, et al, are incorporated herein by reference in their entireties, including drawings, and hereby are made a part of this application.

BACKGROUND OF THE INVENTION

1. Field of the Invention

This invention relates to the arts of computer disk media, formatting of computer disks, organization of computer readable media by operating systems and device drivers, and the management of logical volumes of computer disks. In particular, this invention relates to improvements to the control of data and boot records stored in logical volumes when the logical volumes comprise multiple layers of aggregation.

2. Description of the Related Art

Figure 1:
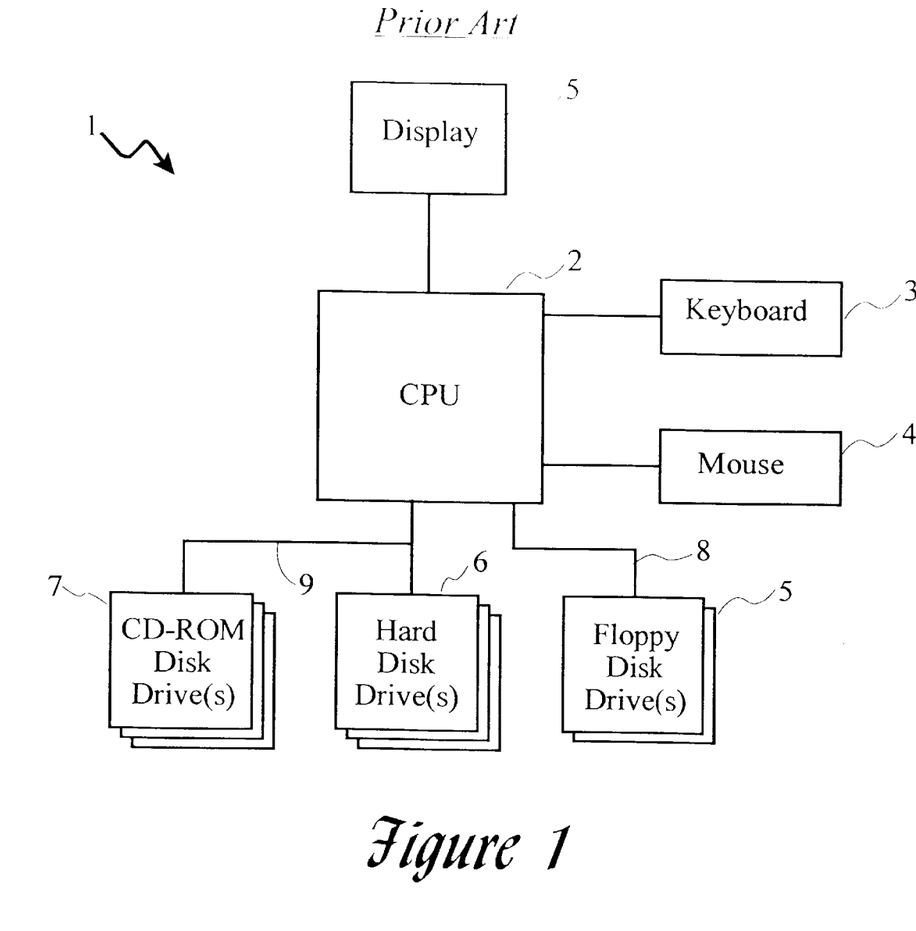
FIG. 1 discloses the fundamental hardware architecture of a computer such as a personal computer.

Persistent and mass data storage devices for computer systems, especially those employed in personal computers, are well known within the art. Many are disk-based, such as floppy disks, removable hard disk drives ("HDD"), and compact-disk read only memories ("CD-ROM"). FIG. 1 shows a typical personal computer system (1) architecture, wherein a CPU (2) interfaces to a variety of I/O devices such as a keyboard (3), monitor or display (5) and a mouse (4). The CPU (2) also may interface to a number of storage peripherals including CD-ROM drives (7), hard disk drives (6), and floppy drives (5). Typically, floppy disk drives interface to the CPU via Integrated Drive Electronics ("IDE") (8), but this interface may alternately be one of several other standard interfaces or a proprietary interface. The hard disk drives (6) and CD-ROM drives (7) may interface to the CPU (2) via an IDE or Small Computer System Interface ("SCSI"), as shown (9).

Figure 2:
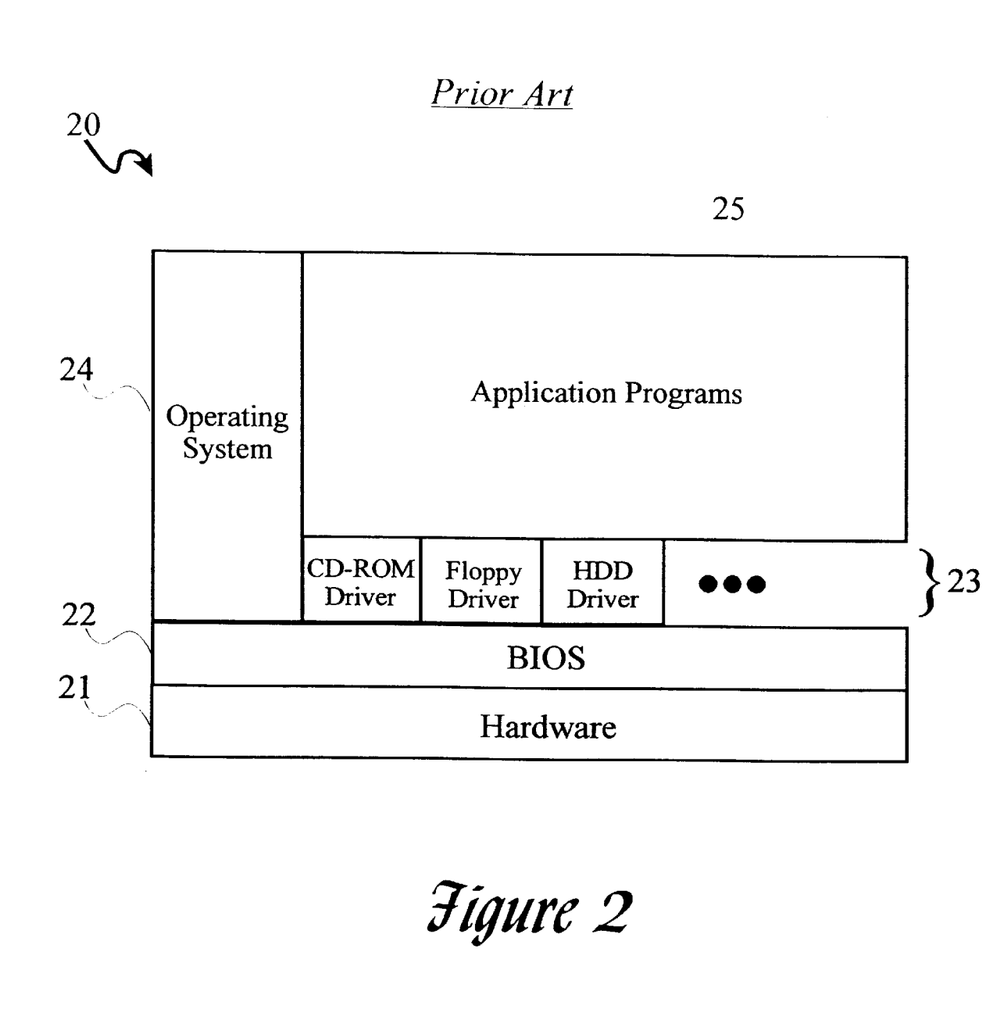
FIG. 2 discloses the fundamental software architecture of such a computer.

FIG. 2 shows a generalization of the hardware, firmware and software organization of a personal computer system (20). The hardware group (21) includes the persistent storage devices discussed supra, as well as other system hardware components such as a real-time clock, keyboard controller, display adapter, etc. A basic input/output system ("BIOS") (22) provides the direct firmware control of these system components typically. An operating system (24) such as the IBM OS/2 operating system provides high level management of the system resources, including the multitasking or multi-threaded scheduling and prioritization of the system application programs (25). Drivers (23) provide specific high-level interface and control functions for specific hardware, such as a manufacturer and model-specific LAN interface card driver or CD-Rewritable ("CD-RW") driver. This generalized view of the system also applies to systems on alternate, non-IBM-compatible platforms, such as workstations, which employ a variety of operating systems such as Microsoft Windows, UNIX or LINUX. This general organization of computer system resources and software functionality is well understood in the art.

Figure 3:
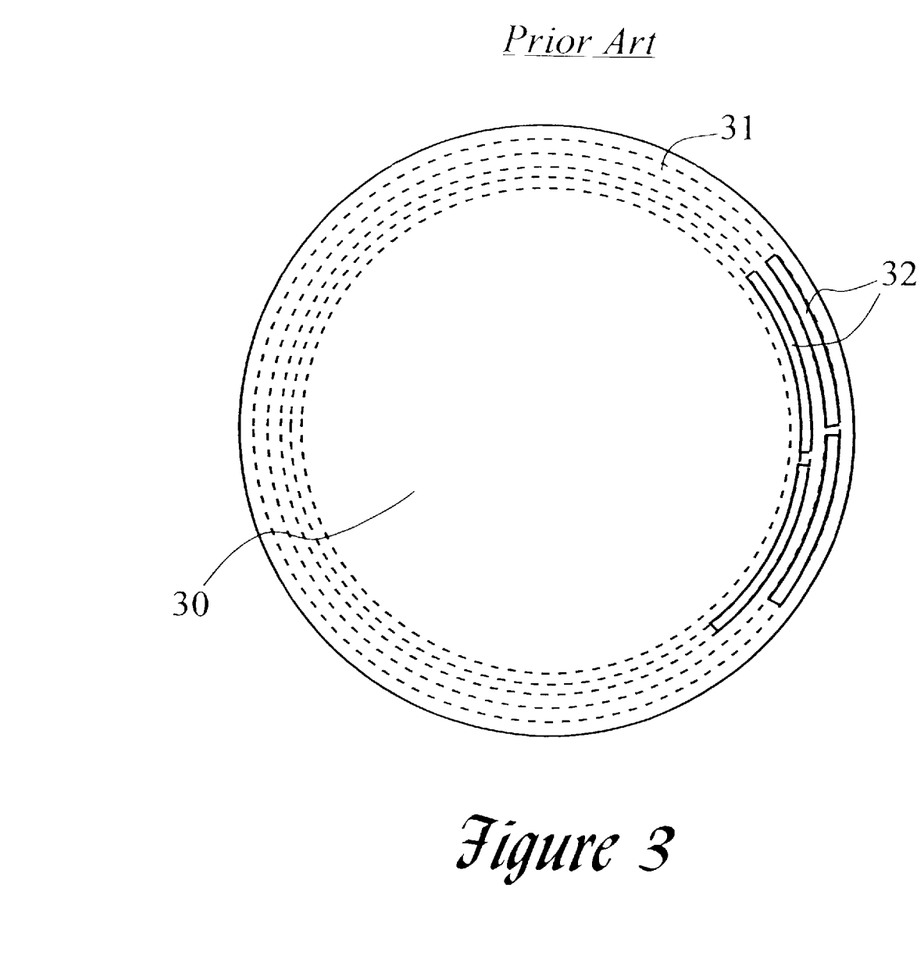
FIG. 3 illustrates the nature of formatting computer disk surfaces into tracks.

Turning to FIG. 3, disk-based mass storage devices such as hard disk drives, floppy disks and CD-ROMS are based physically on a rotating storage platter (30). This platter may be made of flexible mylar, such as floppy disks, or more rigid platters made of aluminum, glass or plastic, such as hard disk drives and CD-ROMS. For magnetic media, one or both sides of the platter are coated with a magnetic layer capable of recording magnetic pulses from a read/write head. For optical media, data recording is made using changes in reflectivity of a band of light, which is then read by a laser-based head. Writable and Re-writable CD-ROM drives combine the technologies of magnetic disks and optical disks. In general, though, the organization of data on the disk is similar. The disk surfaces are divided into multiple concentric rings, or tracks (31). Some disk drives, such as hard disk drives, consist of multiple platters, in which case corresponding tracks on each platter are grouped into cylinders. Each track is divided into multiple sectors (32) in which data can be stored.

Figure 4:
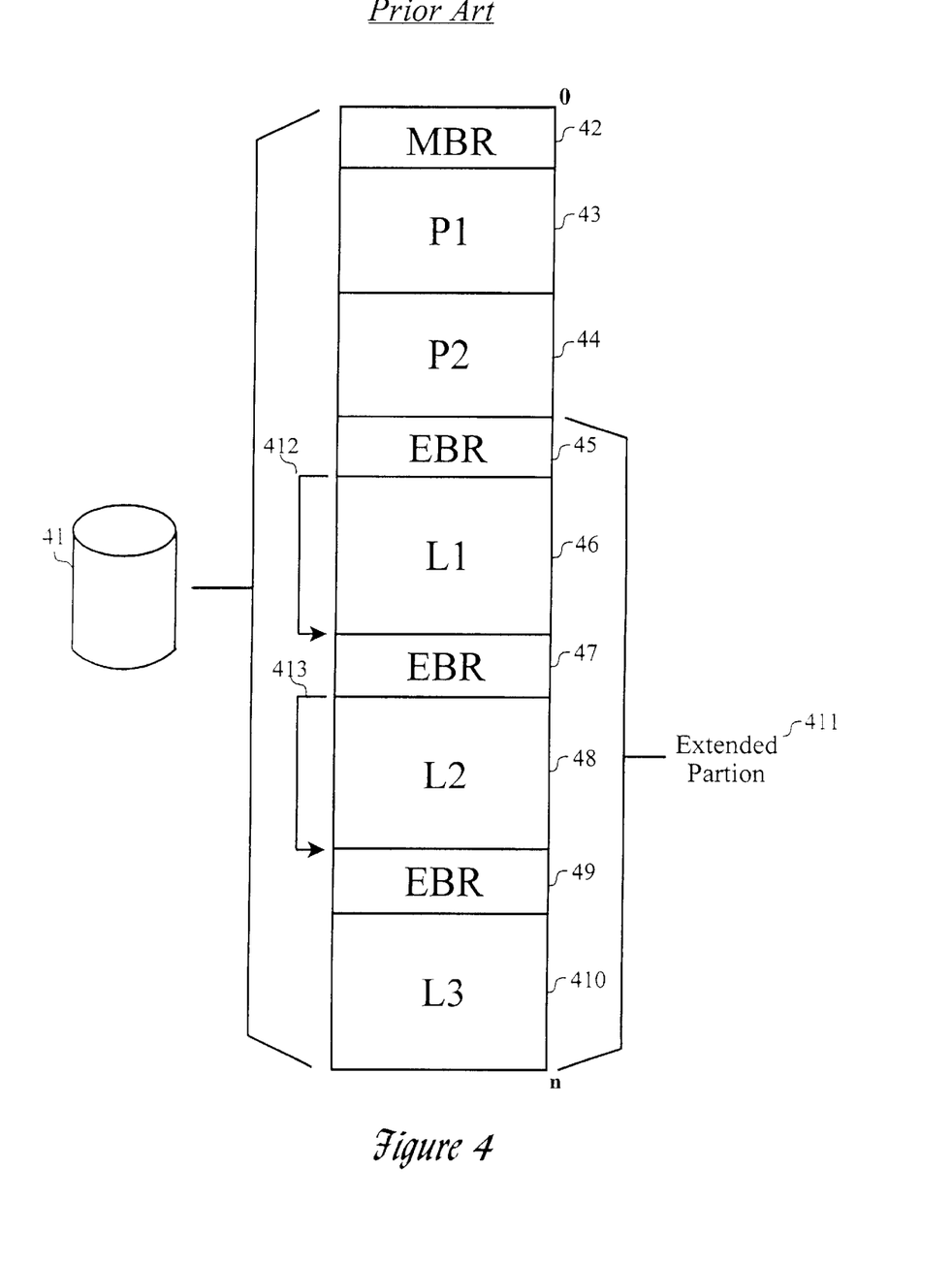
FIG. 4 shows the organization of the disk sectors into boot records and partitions.

Turning to FIG. 4, a computer disk drive (41) is represented as an ordered collection of sectors numbered 0 through "n". The very first sector on the hard drive, sector zero, contains the Master Boot Record ("MBR"). The MBR contains partition definitions for the rest of the disk. TABLE 1 shows a sample partial MBR.

TABLE 1

Partition Table for 6 GB Drive

| Partition | Start (cyl. side, sector) | End (cyl, side, sector) | Length (sectors) |
| --- | --- | --- | --- |
| first | 0, 1, 1 | 391, 254, 63 | 6297417 |
| second | 392, 0, 1 | 783, 254, 63 | 6297480 |

For the disk partitioning shown in TABLE 1, the MBR is located in the first sector on side 0 at cylinder 0 sector 1. The MBR requires only one sector, but the entire track of 63 sectors is "blocked" for the use of the MBR, 62 sectors of side 0 cylinder 0 are left unused.

The partition table has entries in it defining two types of partitions: primary and extended. Conventional disk formatting schemes allow only one extended partition (411) to be defined. P1 (43) and P2 (44) are primary partitions. The order and locations of the primary and extended partitions may vary, but invariably there are entries in the partition table of the MBR which defines them.

The extended partition (411) is defined in the partition table in the MBR as a single partition using a single entry in the MBR partition table. Basically, this entry in the MBR just indicates to the computer operating system that inside of this extended partition can be found other partitions and partition definitions. The operating system typically assigns logical drive letters and/or logical volumes to these partitions, or groups of partitions.

In order to determine the size and location of the partitions within the extended partition, the operating system accesses the first sector of the extended partition which typically contains another boot record, known as an Extended Boot Record ("EBR"). The format of the EBR is similar to that of the MBR, and is also well known in the art.

FIG. 4 shows a first EBR (45), a second EBR (47), and a third EBR (49) within the extended partition (411). In practice, there may be fewer or more EBR's within an extended partition.

Each EBR contains a partition table similar to a MBR partition table. Conventionally for computer drives commonly used in personal computers and workstations, only two entries may be in use in each EBR. One entry will define a logical partition, and the second entry acts as a link, or pointer, to the next EBR. FIG. 4 shows a pointer (412) from the second entry of the first EBR (45) to the beginning of the second EBR (47), and a similar pointer (413) from the second entry of the second EBR (47) to the beginning of the third EBR (413). The last EBR in the extended partition does not contain a pointer to a subsequent EBR, which indicates to the operating system that it is the last EBR in the extended partition. In this manner, the operating system can find and locate the definitions for an unlimited number of partitions or logical drives within the extended partition on a deterministic basis.

In each partition table entry, whether it be an EBR or an MBR, there are certain fields which indicate to the operating system the format, or file system, employed on the disk. For example, for DOS ("disk operating system") systems, the field may indicate that the file system is File Allocation Table ("FAT") formatted. Or, for systems which are running IBM's OS/2 operating system, the entry may indicate that the file system is High Performance File System ("HPFS") formatted. There are a number of well-known file system formats in the industry, usually associated with the common operating systems for computers such as Microsoft's Windows, IBM's OS/2 and AIX, variants of UNIX, and LINUX. Using this field, the operating system may determine how to find and access data files stored within the partitions of the primary and extended partitions on the computer disk. The file system format indicator is sometimes called the "system indicator".

IBM's OS/2 operating system includes a function referred to as the Logical Volume Manager, or "LVM". For systems without an LVM, each of the partitions that is usable by the operating system is assigned a drive letter, such as "C:" or "F:", producing a correlating drive letter for each partition on a disk in the computer system. The process which assigns these letters is commonly known. For systems with an LVM, a drive letter may be mapped instead to a logical volume which may contain one or more partitions. The process by which partitions are combined into a single entity is known generically as "aggregation." Given the highly modular design of the OS/2 LVM, the functionality which performs aggregation is contained completely within a single module of the LVM program. LVM calls any module which performs aggregation an "aggregator".

There are various forms of aggregation, such as drive lining, mirroring, and software Redundant Array of Independent Disks ("RAID"). The OS/2 LVM allows a single level of aggregation through the use of drive linking. Internally, the OS/2 LVM uses a layered model. Each feature offered by the LVM for use on a volume is a layer in the LVM. The input to a layer has the same form and structure as the output from a layer. The layers being used on a volume form a stack, and I/O requests are processed from the top most layer down the stack to the bottom most layer. Currently, the bottom most layer is a special layer called the pass through layer. The top most layer is always the aggregator, which, in the current implementation, is always the drive linking layer. All of the layers in the middle of the stack represent non-aggregation features, such as Bad Block Relocation.

Figure 5:
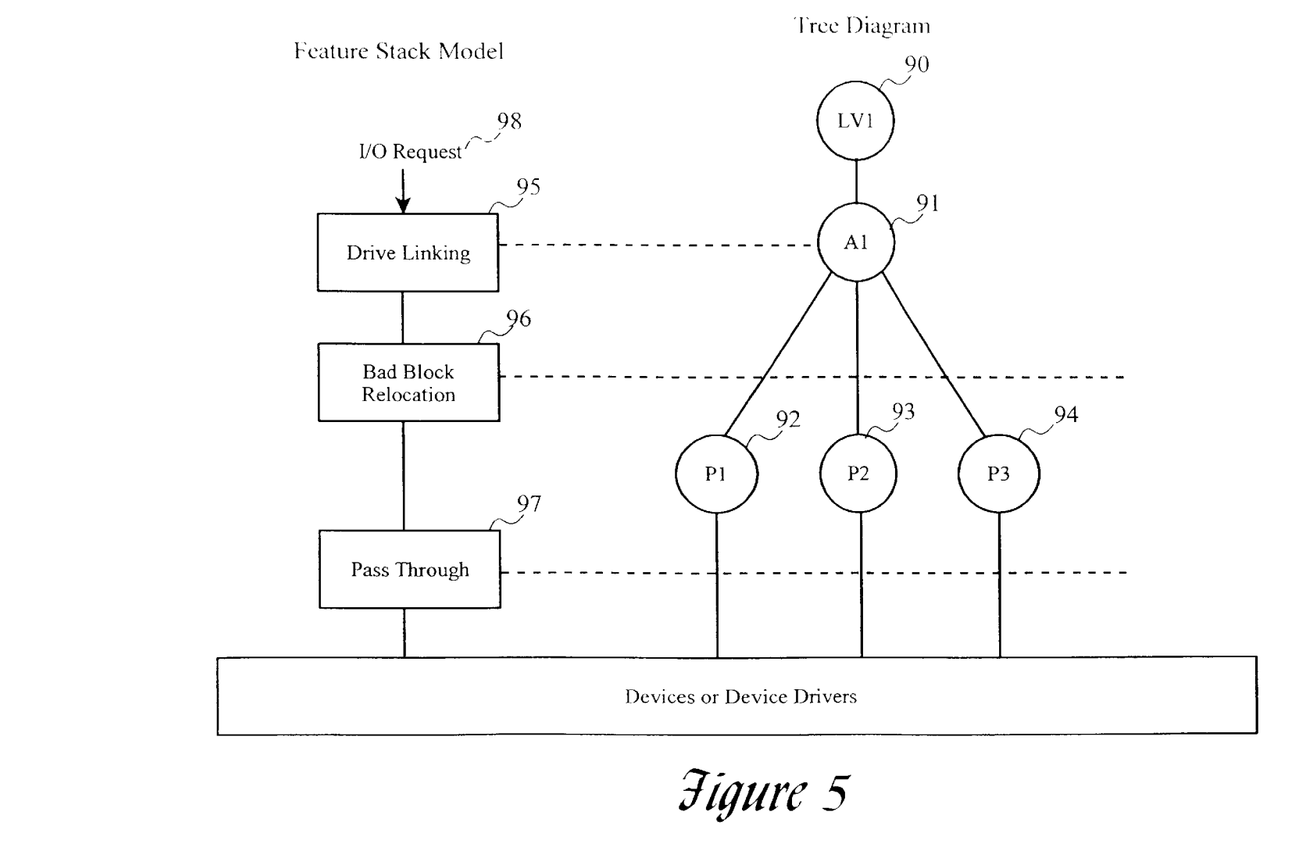
FIG. 5 depicts the relationship between a feature stack model of a LVM and a tree model of an LVM.

FIG. 5 illustrates the relationship of the layered model of the LVM and the aggregation of physical partitions into a logical volume (90). On the left, the "feature stack" is shown, having a "pass through" layer (97) at the bottom which interfaces directly to the disk devices or device drivers. Above the "pass through" layer (97) may be a feature (96), such as Bad Block Relocation ("BBR") Above the feature may be a layer of aggregation, such as drive linking (95). From the view of the feature stack model, an I/O request (98) is received at the top of the stack and propagated downwards to the pass through layer. Comparing that to a tree model of a logical volume (90), the aggregator A1 (91) corresponds to the a aggregation layer (95), the feature layer (96) corresponds to the three interfaces between the aggregator A1 (91) and it's partition definitions P1, P2, and P3 (92, 93, and 94 respectively), and the pass through layer (97) corresponds to the interfaces between the partition definitions and the actual devices or device drivers. These types of LVM structures, feature stack models, and tree models are well understood in the art, and the models can be equally well applied to logical volume management systems in other operating systems such as Hewlett Packard's HP-UX and IBM's AIX.

Partitions which are part of a logical volume have a special filesystem format indicator. This indicator does not correspond to any existing filesystem, and it serves to identify the partitions as belonging to a logical volume. The actual filesystem format indicator for a logical volume is stored elsewhere. Furthermore, partitions belonging to a volume have an LVM Data Area at the end of each partition in the volume. The data stored in the LVM Data Area allows the LVM to re-create the volume every time the system is booted. Thus, the LVM allows groupings of partitions to appear to the operating system as a single entity with a single drive letter assignment.

In previous versions of the OS/2 operating system, a file system utility such as the FORMAT disk utility would access the partition table for the partition that was being formatted through low level Input/Output Control ("IOCTL") functions. The system provides IOCTL's to allow a software application to directly read and write to the computer disk, bypassing the file system, rather than using filed-based operations.

Using the IOCTL functions, an application program can actually access everything from the EBR that defines the partition being processed to the end of the partition itself. This allows disk utilities to find the partition table entry that corresponds to the partition they are processing, and alter it. For example, FORMAT will update the filesystem format indicator in the partition table entry for each partition that it formats successfully. While this method works fine for processing individual partitions, it creates problems when dealing with logical volumes. Logical volumes appear to the system as a single entity, which means that they will look just like a partition to older disk utilities, which will naturally try to treat them as such. However, since a logical volume may contain more than one partition, there is no EBR or partition table entry which describes it. If the older disk utilities are allowed to access the EBR or partition table entry for one of the partitions contained within the logical volume, the partition described in the partition table entry will not agree with what the disk utility sees as the partition. Furthermore, if the disk utility alters the partition table entry, such as when FORMAT updates the filesystem format indicator, the resulting partition table entry will not be correct. Thus, older disk utilities must not be allowed to access the EBR or partition table entry for a partition contained within a logical volume, yet they need an EBR and partition table entry in order to function correctly.

In the first version of the OS/2 LVM, this problem was solved by creating a "fake" EBR which contained a "fake" partition table entry that described the entire logical volume as if it were a single partition. This "fake" EBR was stored inside of the logical volume on the first partition in the logical volume. The IOCTL functions were intercepted and any requests for an EBR were redirected to the "fake" EBR. This allowed logical volumes to be treated as partitions by older disk utilities, thereby allowing them to function.

The currently available OS/2 LVM design supports only a single layer of aggregation. This places some limitations on what can be done. For example, if software RAID is used as the aggregator, then there is a limit on the number of partitions that can be aggregated into a single volume. However, if multiple levels of aggregation are allowed, then drive linking could be used to aggregate several software RAID aggregates into a volume, thereby providing a volume with all the benefits of software RAID without the limitations of software RAID.

The enhanced LVM described in the first related application provides for multiple layers of aggregation. However, the location of the fake EBR is found by the system software using a broadcast method. According to the broadcast method, when an I/O request to the EBR is detected by the multilevel LVM, each aggregator which does not find the "fake" EBR among its children duplicates the I/O request, flags it as an EBR I/O request, and issues the I/O request to each of its children in parallel simultaneously. This parallel duplication and issuance of I/O requests may descend multiple levels of aggregation. Of all the parallel requests, only one will succeed and the others will be discarded. When an aggregator finds the "fake" EBR among its children, it will redirect the I/O request to the "fake" EBR, and turn off the EBR I/O request flag. When an I/O request reaches the pass through layer, if the EBR I/O request flag is set, the pass through layer will discard that I/O request. Thus, only one I/O request will succeed in reaching the "fake" EBR, and all of the duplicate I/O requests generated along the way will be discarded.

The broadcast method disclosed in the first related application is relatively simple to implement, and, since I/O requests to the EBR are rare, it is reasonably efficient in many applications. An alternative to issuing the duplicate EBR I/O requests in parallel is to issue them in serial, stopping with the first one to succeed. In this case the pass through layer will fail any I/O request which has the EBR I/O flag set instead of discarding such requests.

However, the broadcast method may not meet the system requirements for systems in which the logical volumes are managed heavily, i.e., the fake EBR is accessed often. Because the broadcast method causes many replications of the I/O request from parents to children, the processing time or bandwidth required to process all of the replicated requests may become detrimental to system performance.

A "bottom-to-top" method for locating, managing and controlling the fake EBR is disclosed in the second related application. According to the "bottom-to-top" method, the fake EBR is stored in the LVM data area of a partition belonging to the volume that the fake EBR describes. This LVM data area will have a flag set (the EBR_PRESENT flag) to indicate that it contains the fake EBR. Aggregators will check for this flag among the partitions being aggregated, and, if found, will set the EBR_PRESENT flag in the LVM data area of the aggregate being created. When an I/O request to the EBR is detected by the topmost aggregator, it will scan the children of the topmost aggregate to see which one has the EBR_PRESENT flag set in its LVM data area, it will mark the I/O request as an EBR I/O request, and then direct the I/O request to that child. Any other aggregators which may be encountered will see that the I/O request is an EBR I/O request, and they will automatically direct the I/O request to which ever of their children has the EBR_PRESENT flag set. Thus, the I/O request is propagated down through the multiple aggregation layers of the volume until it reaches the partition containing the fake EBR, at which point the I/O request will be fulfilled using the fake EBR instead of the real EBR.

However, this "bottom-to-top" method requires each aggregator to implement this "flag" finding and setting functionality, including modifications to their application programming interfaces ("API") as needed to support the new functionality. This solution, while an improvement over the broadcast method of the first related application, is still less than optimal due to complexity and inefficiencies. Under the current method, the topmost aggregator is responsible for maintenance of the fake EBR (updating the fake EBR after the volume is resized) while all of the aggregators on the path from the topmost aggregator to the partition containing the fake EBR, as well as the partition containing the fake EBR, are responsible for controlling access to the fake EBR. This division of responsibility is unnecessary, and it adds complexity to the input/output path.

Thus, there exists a need in the art for a multi-layer logical volume management system and method which allows for multiple levels of aggregation and allows for deterministic, efficient location and access of the LVM data area containing the fake EBR.

SUMMARY OF THE INVENTION

The foregoing and other objects, features and advantages of the invention will be apparent from the following more particular description of a preferred embodiment of the invention, as illustrated in the accompanying drawings wherein like reference numbers represent like parts of the invention.

The system and method for control of data and boot records associated with multi-layer logical volumes allows the logical volume data area containing the fake EBR to be deterministically and efficiently accessed by centralizing the maintenance and control of the fake EBR in the topmost aggregator. In previous designs, the maintenance of the fake EBR was the responsibility of the topmost aggregator or of a component above the topmost aggregator. However, responsibility for controlling the access to the fake EBR was distributed among multiple components. Furthermore, the fake EBR was stored in the LVM data area of a partition, not the LVM data area of the topmost aggregator. This resulted in inefficiencies as the topmost aggregator did not have direct access to, or control of, the fake EBR, yet was responsible for maintaining it and redirecting EBR I/O to it. Under this invention, the fake EBR is stored in the LVM data area of the topmost aggregator, and the topmost aggregator now has complete responsibility for the fake EBR, as well as direct access to and control of the fake EBR.

BRIEF DESCRIPTION OF THE DRAWINGS

The following detailed description when taken in conjunction with the figures presented herein present a complete description of the present invention.

DETAILED DESCRIPTION OF THE INVENTION

The invention is preferably realized using a well-known computing platform, such as an IBM personal computer, running the IBM OS/2 operating system. However, it may be realized in other popular computer system platforms, such as a Sun Microsystems or IBM RS/6000 workstation, running alternate operating systems such as Microsoft Windows, HP-UX, UNIX or LINUX, without departing from the spirit and scope of the invention.

By using OS/2 as the operating system of the preferred embodiment, the existing OS/2 Logical Volume Manager ("LVM") which was previously described in the "Background of the Invention" and in the related application can be modified to realize the invention.

The existing OS/2 LVM provides a single-layer of aggregation, called the drive linking layer, and a system for creating and managing logical volumes. It employs a layered model, where each feature or function available for use on a volume is a separate module whose inputs and outputs are the same in form and structure. The features applied to a volume form a stack, with the aggregator (drive linking) being the topmost layer in the stack, and the special pass through layer being the bottom layer of the stack. When a volume is being created (or re-created after a system boot), the feature stack is built from the bottom up, beginning with the pass through layer. Once all of the volumes have been created and are ready for use, the LVM must begin to process I/O requests against the volumes in the system. When an I/O request is processed, it is processed from the top of the stack, down through the layers (the output of one layer is the input to the next), to the bottom of the feature stack where it is then sent on to the device(s).

The existing OS/2 LVM is further modified according to the first related application to realize an LVM with multiple-levels of aggregation. However, the methods for storing and finding the LVM data area containing the fake EBR as described in the related applications are supplemented, replaced, or augmented by the method described herein.

When a volume is being created (or re-created after a reboot), an LVM data area is stored at the end of each actual partition, and at the end of each aggregate. During volume creation (or modification), the fake EBR is stored in the LVM data area of the top-most aggregator in the logical volume.

Figure 6:
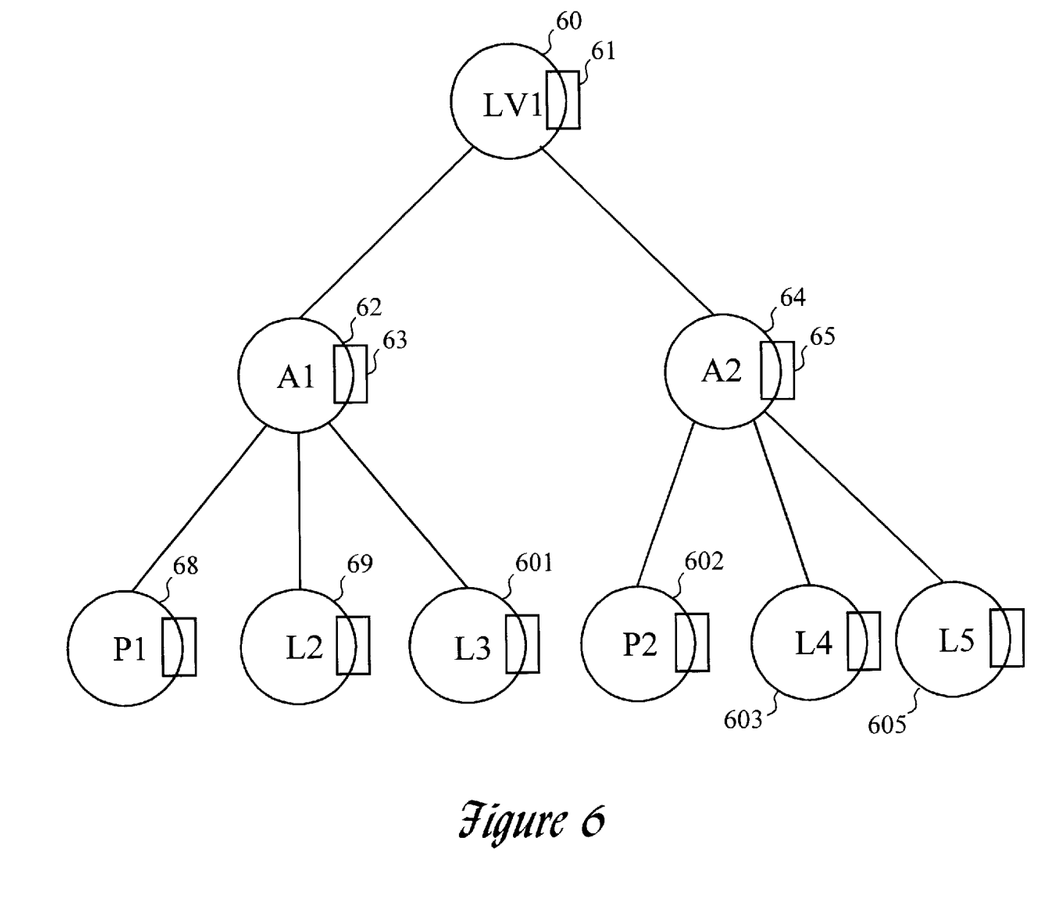
FIG. 6 illustrates a multi-layer logical volume and the apparent locations of the aggregate LVM data areas.

For example, the logical volume of FIG. 6 contains two aggregation layers. The first aggregation layer results in the creation of A1(62) from partitions P1 (68), L2 (69), and L3 (601), and the creation of A2 (64) from partitions P2 and L4 (602 and 603). The second aggregation layer produces the logical volume LV1 (60) by combining A1 and A2 into a single entity. These aggregation layers could represent software RAID, drive linking, or other aggregation technologies which are readily available. The top-down method calls for the "fake" EBR to be created at the end of the logical volume LV1 (60). In the preferred embodiment, the OS/2 LVM has a storage area (61) for its use at the end of the volume, so the "fake" EBR is placed within this LVM data area.

Further according to the top-down method, I/O requests directed to the "fake" EBR are handled by the topmost aggregation layer, and are quickly and easily directed to the "fake" EBR which resides in the LVM data area of the logical volume. No knowledge of any other aggregation layers is needed to find the "fake" EBR, and no other aggregator must provide the control functionality or API for accessing the fake EBR. This is also true for maintenance operations performed on the fake EBR by the topmost aggregator, such as when a volume is resized. When a volume is resized, the fake EBR must be updated so that the size of the volume is accurately reflected in the fake EBR. Keeping the fake EBR in the LVM data area of the topmost aggregate allows the topmost aggregator to update the fake EBR without having to rely upon knowledge of, or special functionality provided by, other aggregation layers in use on the volume. Thus, there is a highly desirable reduction in coupling between the aggregation and feature layers, and an increase in efficiency.

It will be understood by those skilled in the relevant arts and from the foregoing description that various modifications and changes may be made in the preferred embodiment of the present invention without departing from its true spirit and scope, such as the use of alternate computer platforms, operating systems and disk storage means. It is intended that this description is for purposes of illustration only and should not be construed in a limiting sense. The scope of this invention should be limited only by the language of the following claims.

What is claimed is:

1. A method for handling input/output ("I/O") requests and transactions to a multiple-layer aggregated logical volume of computer-readable media in a computer system, said logical volume having a plurality of computer-readable media partitions aggregated into a single computer-readable entity by one or more aggregators, one of said aggregators serving as the top-most aggregator, said multiple-layer aggregated logical volume having an logical beginning and a logical end, and said logical volume containing an extended boot record ("EBR") for describing the construct of the logical volume, said EBR being stored in a partition of the logical volume, the method comprising the steps of:

providing a logical volume manager function executable by said computer system;

defining one or more logical volume manager ("LVM") data areas within said multiple-layer logical volume, at least one of said LVM data area being stored at a predetermined position within said logical volume and being designated as the LVM data area for the top-most aggregator;

creating a fake EBR stored within the top-most aggregator's LVM data area, said fake EBR containing indicators compatible with standard computer system disk utility functions, said indicators containing an indication of multiple layer logical volume construction for the logical volume; and re-directing I/O requests for said multiple layer logical volume so as to access the fake EBR, such that standard computer system disk utilities attempting to access the multiple layer logical volume will access the fake EBR.

2. The method as set forth in claim 1 wherein said predetermined position for said top-most aggregator's LVM data area is at the logical end of multiple-layer aggregated logical volume.

3. The method as set forth in claim 1 wherein said step of providing a logical volume manager function executable by said computer system comprises providing an OS/2 logical volume manager function.

4. The method as set forth in claim 1 wherein said step of providing a logical volume manager function executable by said computer system comprises providing a Linux logical volume manager function.

5. The method as set forth in claim 1 wherein said step of providing a logical volume manager function executable by said computer system comprises providing a Microsoft logical volume manager function. Windows compatible logical volume manager function.

6. The method as set forth in claim 1 wherein said step of providing a logical volume manager function executable by said computer system comprises providing a Unix logical volume manager function.

7. The method as set forth in claim 1 wherein said step of providing a logical volume manager function executable by said computer system comprises providing an AIX compatible logical volume manager function.

8. The method as set forth in claim 1 wherein said step of providing a logical volume manager function executable by said computer system comprises providing a Sun Microsystems Solaris compatible logical volume manager function.

9. A computer-readable storage medium having stored therein computer-readable program code for handling input/output ("I/O") requests and transactions to multiple-layer aggregated logical volumes of computer-readable media in a computer system, said logical volume having a plurality of computer-readable media partitions aggregated into a single computer-readable entity by one or more aggregators, one of said aggregators serving as the top-most aggregator, said multiple-layer aggregated logical volume having an logical beginning and a logical end, and said logical volume containing an extended boot record ("EBR") for describing the construct of the logical volume, said EBR being stored in a partition of the logical volume, wherein the program code when executed by the processor causes the processor to perform the steps of:

providing a logical volume manager function executable by said computer system;

defining one or more logical volume manager ("LVM") data areas within said multiple-layer logical volume, at least one of said LVM data area being stored at a predetermined position within said logical volume and being designated as the LVM data area for the top-most aggregator, creating a fake EBR stored within the top-most aggregator's LVM data area, said fake EBR containing indicators compatible with standard computer system disk utility functions, said indicators containing a indication of multiple layer logical volume construction for the logical volume; and re-directing I/O requests for said multiple layer logical volume so as to access the fake EBR, such that standard computer system disk utilities attempting to access the multiple layer logical volume will access the fake EBR.

10. A computer-readable storage medium having stored therein computer-readable program code as set forth in claim 9, further comprising program code when executed by the processor causes the processor to store said top-most aggregator's LVM data area at the logical end of multiple-layer aggregated logical volume.

11. The computer-readable storage medium as set forth in claim 9 wherein said logical volume manager function program code comprises an OS/2 logical volume manager function.

12. The computer-readable storage medium as set forth in claim 9 wherein said logical volume manager function program code comprises a Linux logical volume manager function.

13. The computer-readable storage medium as set forth in claim 9 wherein said logical volume manager function program code comprises a Microsoft Windows compatible logical volume manager function.

14. The computer-readable storage medium as set forth in claim 9 wherein said logical volume manager function program code comprises a Unix compatible logical volume manager function.

15. The computer-readable storage medium as set forth in claim 9 wherein said logical volume manager function program code comprises an AIX compatible logical volume manager function.

16. The computer-readable storage medium as set forth in claim 9 wherein said logical volume manager function program code comprises a Sun Microsystems Solaris compatible logical volume manager function.

17. A system for creating and managing a multiple layer aggregation logical volume of computer-readable media in a computer, said logical volume comprising a plurality of computer-readable partition and a plurality of aggregators, said plurality of aggregators having a top-most aggregator, said multiple layer aggregation logical volume having a logical beginning and a logical end, said computer having at least one computer-readable media device having at least one processor capable of executing computer software, said computer being interfaced to at least one computer readable media device or devices, eh device having a plurality of computer-readable media partition, said system comprising:

a multi-layer logical volume manager which allows multiple layers of aggregation of said computer-readable media partitions by multiple aggregators to be combined into a single logically accessible entity by said computer processor and software being executed by said computer processor;

at least one logical volume management ("LVM") data area disposed in said multi-layer logical volume, one of such LVM data areas being designated as the top-most aggregator's LVM data area and being stored at a predetermined location within the multi-layer logical volume;

a fake extended boot record ("EBR") disposed in said top-most aggregator's LVM data area said fake EBR containing indicators compatible with standard computer system disk utility functions, said indicators containing a indication of multiple layer logical volume construction for the logical volume; and an I/O request re-director responsive to computer I/O requests to said multiple layer logical volume so as to access the fake EBR upon such requests, thereby allowing standard computer system disk utilities attempting to access the multiple layer logical volume to access the fake EBR.

18. A system for creating and managing logical volumes of computer-readable media as set forth in claim 17 wherein said predetermined storage location for said top-most aggregator's LVM data area is the logical end of the multi-layer logical volume.

19. A system for creating and managing logical volumes of computer-readable media as set forth in claim 17 wherein said multi-layer logical volume manager aggregators further comprise a Redundant Array of Independent Disks ("RAID") array of computer-readable media.

20. A system for creating and managing logical volumes of computer-readable media as set forth in claim 17 wherein said multi-layer logical volume manager aggregators further comprise a disk mirroring subsystem.

21. A system for creating and managing logical volumes of computer-readable media as set forth in claim 17 wherein said multi-layer logical volume manager aggregators further comprise a drive linking subsystem.

22. A system for creating and managing logical volumes of computer-readable media as set forth in claim 17 wherein said multi-layer logical volume manager comprises an enhanced IBM OS/2 LVM.

23. A system for creating and managing logical volumes of computer-readable media as set forth in claim 17 wherein said multi-layer logical volume manager comprises a Linux LVM.

24. A system for creating and managing logical volumes of computer-readable media as set forth in claim 17 wherein said multi-layer logical volume manager comprises an Microsoft Windows compatible LVM.

25. A system for creating and managing logical volumes of computer-readable media as set forth in claim 17 wherein said multi-layer logical volume manager comprises a Unix compatible LVM.

26. A system for creating and managing logical volumes of computer-readable media as set forth in claim 17 wherein said multi-layer logical volume manager comprises an enhanced IBM AIX LVM.

27. A system for creating and managing logical volumes of computer-readable media as set forth in claim 17 wherein said multi-layer logical volume manager comprises a Sun Microsystems Solaris LVM.

\* \* \* \* \*

UNITED STATES PATENT AND TRADEMARK OFFICE
CERTIFICATE OF CORRECTION

PATENT NO.    : 6,711,591 B1
DATED         : March 23, 2004
INVENTOR(S)   : Benedict Michael Rafanello It is certified that error appears in the above-identified patent and that said Letters Patent is hereby corrected as shown below:

<u>Column 9,</u>
Line 23-24, change "Microsoft logical volume manager function. Windows compatible logical volume manager function" to -- Microsoft Windows compatible logical volume manager function. --

Signed and Sealed this

Thirteenth Day of July, 2004

JON W. DUDAS
*Acting Director of the United States Patent and Trademark Office*